(12) United States Patent
Zeng

(10) Patent No.: US 12,175,693 B2
(45) Date of Patent: Dec. 24, 2024

(54) METHOD FOR MEASURING DIMENSIONS OF PLANT

(71) Applicant: OMRON Corporation, Kyoto (JP)

(72) Inventor: Xiangyu Zeng, Kyoto (JP)

(73) Assignee: OMRON CORPORATION, Kyoto (JP)

(*) Notice: Subject to any disclaimer, the term of this patent is extended or adjusted under 35 U.S.C. 154(b) by 165 days.

(21) Appl. No.: 18/007,304

(22) PCT Filed: Jul. 29, 2021

(86) PCT No.: PCT/JP2021/028073
§ 371 (c)(1),
(2) Date: Jan. 30, 2023

(87) PCT Pub. No.: WO2022/044682
PCT Pub. Date: Mar. 3, 2022

(65) Prior Publication Data
US 2023/0289990 A1 Sep. 14, 2023

(30) Foreign Application Priority Data
Aug. 27, 2020 (JP) .................. 2020-143602

(51) Int. Cl.
G06T 7/60 (2017.01)
(52) U.S. Cl.
CPC ...... *G06T 7/60* (2013.01); *G06T 2207/10028* (2013.01); *G06T 2207/30204* (2013.01)
(58) Field of Classification Search
CPC ............. G06T 7/60; G06T 2207/10028; G06T 2207/30204
See application file for complete search history.

(56) References Cited

U.S. PATENT DOCUMENTS

| 2011/0116688 | A1* | 5/2011 | Li | G01N 33/0098 |
| | | | | 382/110 |
| 2012/0169868 | A1 | 7/2012 | Bae | |
| 2019/0075732 | A1 | 3/2019 | Gowa | |

FOREIGN PATENT DOCUMENTS

| CN | 103162635 A | 6/2013 |
| CN | 209802305 U | 12/2019 |

(Continued)

OTHER PUBLICATIONS

Written Opinion issued in International Appln. No. PCT/JP2021/028073 mailed Oct. 19, 2021. English translation provided.

(Continued)

*Primary Examiner* — Jamil Ahmed
(74) *Attorney, Agent, or Firm* — ROSSI, KIMMS & McDOWELL LLP

(57) ABSTRACT

A method for measuring a dimension of a plant can measure the dimension of a plant efficiently with high accuracy. A method for measuring a dimension of a plant with an image of the plant captured with an imager includes placing, behind the plant, a background plate including a dimensional reference in capturing the image of the plant with the imager, capturing an image of a dimensional measurement point of the plant multiple times with a distance between the dimensional measurement point and the background plate being unchanged and with an imaging distance being changed by moving the imager, and measuring the dimension of the plant based on a value of a dimension at the dimensional measurement point in multiple images resulting from capturing the image multiple times using the dimensional reference in the background plate and on a range of imaging with the imager in each of the images.

4 Claims, 5 Drawing Sheets

(56) References Cited

FOREIGN PATENT DOCUMENTS

| CN | 210491057 U | 5/2020 |
|----|-------------|--------|
| JP | 2012055207 A | 3/2012 |
| JP | 2017042133 A | 3/2017 |
| JP | 2017104037 A | 6/2017 |
| JP | 2020099215 A | 7/2020 |

OTHER PUBLICATIONS

International Search Report issued in International Appln. No. PCT/JP2021/028073 mailed Oct. 19, 2021. English translation provided.

* cited by examiner

METHOD FOR MEASURING DIMENSIONS OF PLANT

TECHNICAL FIELD

The present invention relates to a method for measuring a dimension of a plant.

BACKGROUND

An example known method for measuring a dimension of a plant uses a measurement tool such as a tape measure or a caliper placed in contact with a plant stem to measure the diameter of the plant stem. However, such contact with the plant during measurement may negatively affect the vegetative growth of the plant. Further, to measure the diameter of the plant stem at a branching portion of the plant, the branching portion can obstruct placement of the measurement tool into contact with the plant.

Another example measurement method for plants may be a system that captures an image of a target plant from above with an imager and measures the characteristics of the plant stem through image analysis (refer to, for example, Patent Literature 1). Such image analysis allows simple and highly accurate measurement of a plant with little contact with the plant.

A method for measuring a dimension of a plant using image analysis may use a white background plate including black markers placed behind the plant when an image of the plant is captured. However, placing the plant stem in close contact with the white background plate is actually difficult when the plant is three-dimensional and has branches and leaves, thus causing a measurement error resulting from the distance between the plant stem and the white background plate.

RELATED ART DOCUMENTS

Patent Documents

Patent Literature 1: Japanese Unexamined Patent Application Publication No. 2017-104037

SUMMARY

Technical Problem

With the measurement method described above, the white background plate may be placed behind the plant to evaluate the degree of vegetative growth of the plant, and a digital camera or another imager may be used to capture an image of the plant stem. The diameter of the plant stem may then be measured using a predetermined image analysis program. Although the plant stem and the background plate are actually at a distance from each other, this method yields a value for the plant stem that is hypothetically in close contact with the white background plate. The measurement value of the plant stem diameter using the image analysis program can thus often exceed the true value. Further, measuring the distance between the plant stem and the white background plate using the image analysis program is difficult.

In response to a measurement error described above, one or more aspects of the present invention are directed to an improved method for capturing an image of a plant stem and measuring a dimension of the plant to reduce an error in the measurement value of the diameter of the plant stem. The vegetative growth of the plant is to be managed based on the measurement value of the diameter of the plant stem measured with high reliability.

The method for measuring a dimension of a plant according to the above aspects of the present invention may use a parameter to be measured other than the diameter of the plant stem.

Solution to Problem

A method according to an aspect of the present invention is a method for measuring a dimension of a plant with an image of the plant captured with an imager. The method includes placing, behind the plant, a background plate including a dimensional reference in capturing the image of the plant with the imager, capturing an image of a dimensional measurement point of the plant a plurality of times with a distance between the dimensional measurement point and the background plate being unchanged and with an imaging distance being changed by moving the imager, and measuring the dimension of the plant based on a dimension at the dimensional measurement point in a plurality of images resulting from capturing the image the plurality of times using the dimensional reference included in the background plate and on a range of imaging with the imager in each of the plurality of images.

In the above aspect to the present invention, an actual dimension of a target plant can be geometrically calculated using each parameter obtained in a plurality of imaging operations. In addition, when an image of the dimensional measurement point of the plant is captured, the distance between the dimensional measurement point and the background plate is not changed, and the imaging distance is changed simply by moving the imager. This allows highly accurate measurement of the dimension of the plant by calculation, independently of the distance between the dimensional measurement point and the background plate.

In the above aspect of the present invention, the dimensional measurement point of the plant may include a diameter of a stem of the plant at a predetermined length below a growth point of the plant. The measurement point can be set in an optimal portion as an indicator to determine whether the level of the vegetative growth is appropriate for the plant. This allows the state of the vegetative growth of the plant to be obtained more accurately. In the above aspect of the present invention, the predetermined length may be, for example, 20 cm.

In the above aspect of the present invention, the dimensional reference may include a plurality of markers located on the background plate being white. The plurality of markers may be at a predetermined distance from one another. This allows the dimensional measurement point and parameters of the imaging range with the imager to be calculated based on the distance between the plurality of markers in analysis using an image analysis program. In the above aspect of the present invention, the distance between the plurality of markers may be, for example, 30 cm.

In the above aspect of the present invention, the capturing the image of the dimensional measurement point may include displaying an imaging mask being a frame on an imaging screen of the imager, and placing the dimensional measurement point and the dimensional reference inside the frame in the imaging mask. The frame may be brighter inside than outside the frame during capturing of the image. This facilitates positioning of the dimensional measurement point in capturing an image of the dimensional measurement point and prevents a measurement error due to use of a point being too close to an edge.

Advantageous Effects

In the above aspects of the present invention, the dimension of the plant can be efficiently measured with high accuracy to more efficiently manage plant cultivation based on the obtained dimensional value. For measuring the diameter of the plant stem, for example, the obtained value can be used to more accurately determine whether the plant has an appropriate level of the vegetative growth for more accurate adjustment of the amounts of water and fertilizer.

DETAILED DESCRIPTION

Example Use

In an example use, a method for measuring the diameter of a plant stem will be described as an example of a method for measuring a dimension of a plant. The method for measuring the diameter of a plant stem includes placing, behind the plant stem, a white background plate including markers located at a predetermined distance from one another to provide more accurate information on the position coordinates of a measurement point as a target. With the background plate placed behind the plant stem as the measurement target, an image of the plant stem and the background plate is captured, and the diameter of the plant stem in the image can be calculated based on the distance between the markers on the white background plate in analyzing the captured image.

Placing the plant stem for which an image is captured with the imager in close contact with the white background plate is actually difficult when the plant growth point is three-dimensional and has branches and leaves. However, the plant stem in the captured image is hypothetically in close contact with the white background plate. Thus, measuring the diameter of the plant stem can involve a measurement error resulting from the distance between the plant stem and the white background plate, causing the measurement value of the diameter of the plant stem to be greater than the true value.

To eliminate the measurement error resulting from the distance between the plant stem and the white background plate, an image of the plant stem is captured twice with the distance between the plant stem and the white background plate being unchanged and with the imaging distance being changed simply by moving the imager.

In analyzing the captured image, an upper end of the stem of the captured plant is used as a growth point of the target plant, and the stem diameter is measured at, for example, 20 cm below the growth point. The stem diameter is calculated by geometry-based calculation using the stem diameter obtained in each of the two imaging operations as a parameter. The above parameters are all obtained based on the markers on the background plate.

Embodiment

The method for measuring a dimension of a plant according to the embodiment of the present invention will be described in detail with reference to the drawings. The measurement of the plant stem diameter will be described as the measurement of the dimension of the plant in the embodiment of the present invention. The method described below is a mere example of the method for measuring a dimension of a plant according to an embodiment of the present invention, and is not limited to the dimensional measurement target or the dimensional measurement procedure described below.

Figure 1:
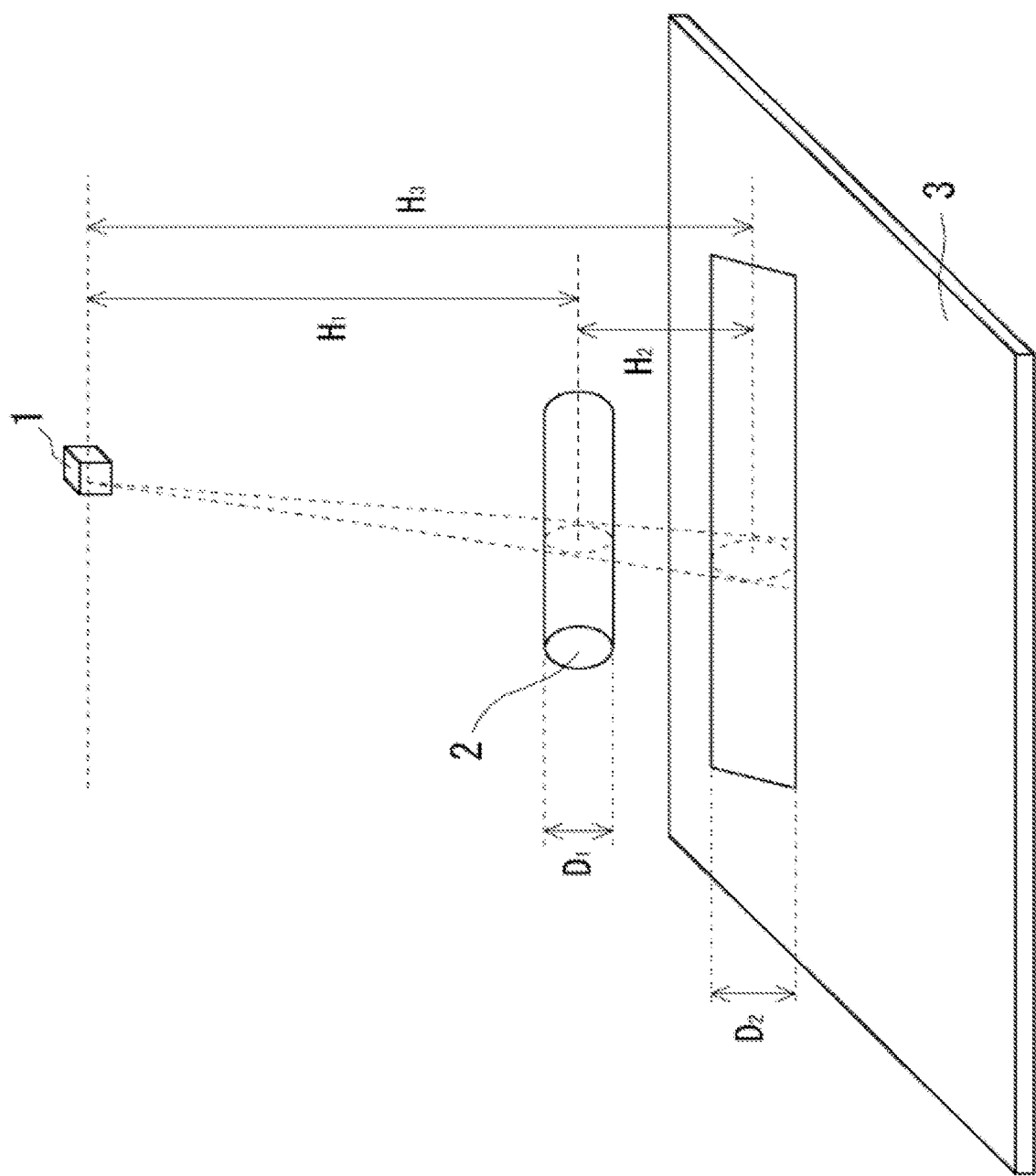
FIG. 1 is a schematic diagram of an imaging operation of a plant stem with an imager.
Figure 2:
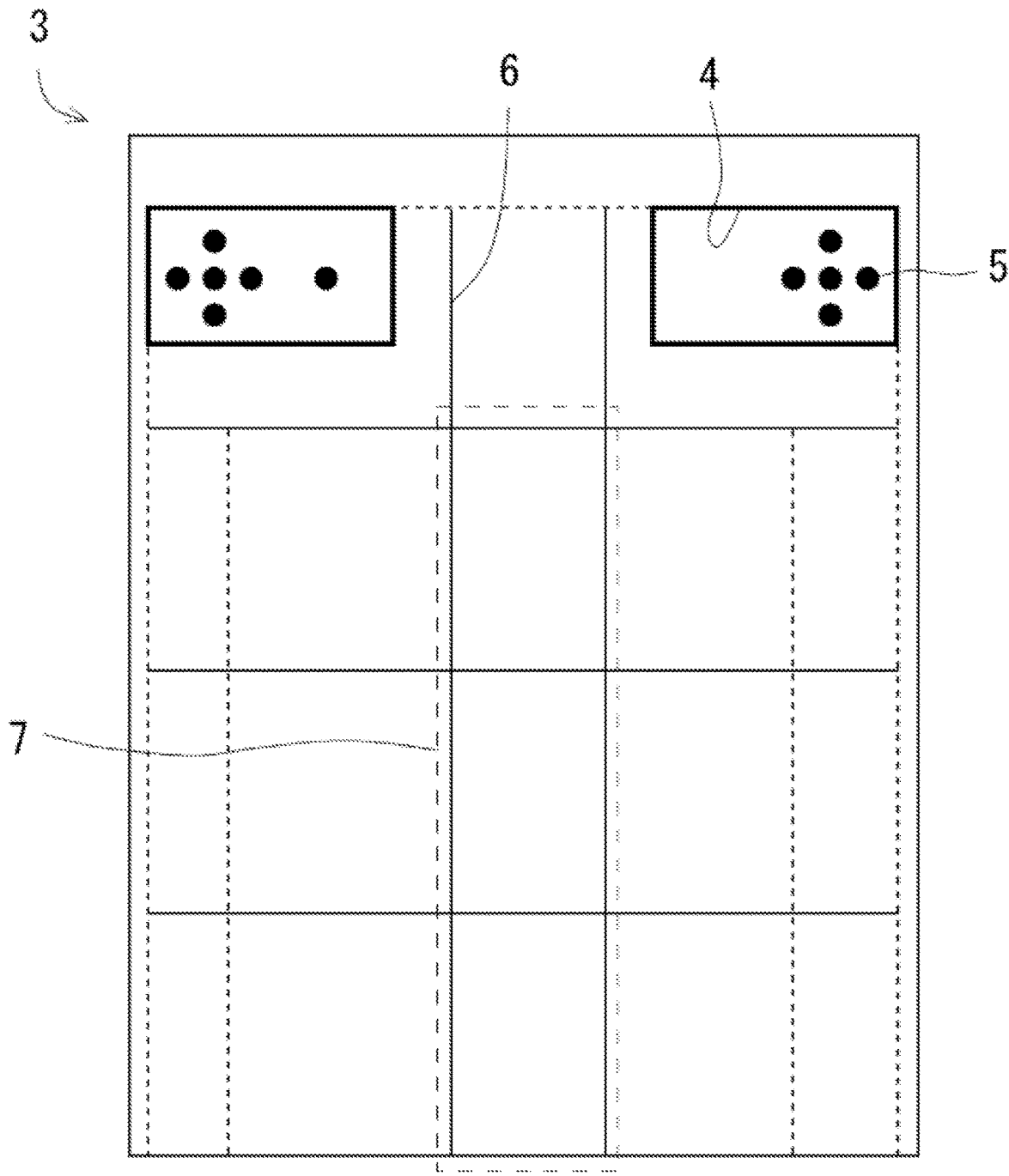
FIG. 2 is a schematic diagram of a background plate showing its surface features in an embodiment of the present invention.

<Dimensional Measurement Method> FIG. 1 is a schematic diagram of an imaging operation of a plant stem 2 with an imager 1. For example, the imager 1 may typically be a digital camera. FIG. 2 is a schematic diagram of a background plate 3 in FIG. 1 showing its surface features. The background plate 3 is typically white. An image of the plant stem 2 is captured with the imager 1 with the background plate 3 placed behind the plant stem 2. A measurement point is identified in image analysis, for which the diameter is then measured. In capturing an image of the plant stem 2, the plant stem 2 may be ideally in close contact with the background plate 3 behind the plant stem 2. However, the plant stem 2 and the background plate 3 are at a distance $H_2$ between them when the plant growth point is three-dimensional and has branches and leaves. The growth point of the plant herein refers to an actively dividing cellular portion at the tip of the plant stem.

As shown in FIG. 1, although the true value of the diameter of the plant stem 2 is $D_1$, the diameter is measured as $D_2$ for the plant stem 2 that is hypothetically in close contact with the background plate 3. With the value $D_2$ greater than the value $D_1$, the measurement value of the diameter of the plant stem 2 exceeds the true value. In an imaging operation, the diameter $D_1$ can be calculated when the distance $H_1$ between the imager 1 and the plant stem 2 is known, but the distances $H_2$ and $H_3$ between the imager 1 and the background plate 3 are difficult to measure. Determining the distance $H_1$, or the difference between $H_3$ and $H_2$, is thus difficult. For measuring the diameter of the plant stem 2, a method for eliminating such a measurement error is awaited.

The dimensional measurement of, for example, the diameter of the plant stem 2 is performed using the background plate 3 shown in FIG. 2 and the captured image. The background plate 3 includes two marker areas 4 in the upper right and upper left in the direction shown in FIG. 2, and multiple markers 5 in each of the marker areas 4. The vertical direction of the background plate 3 in an imaging operation may be reversed upside down. The markers 5 herein each correspond to a dimensional reference in an aspect of the present invention.

The captured image of the plant stem 2 with the background plate 3 placed behind the plant stem 2 includes the multiple markers 5 with predetermined reference position coordinates. The diameter of the plant stem 2 can be measured based on the number of pixels between the multiple markers 5 on the image and the number of pixels in the width of the target plant stem 2. Each marker 5 is typically a solid circle. At least one marker 5 may be included in each of the two marker areas 4. In an imaging operation with the imager 1, the marker areas 4 are defined to be fully within the imaging range. In an imaging operation, the marker areas 4 are to avoid being shadowed.

The background plate 3 also includes measurement lines 6 that can be used to measure, for example, the width of plant leaves. The solid lines that intersect vertically and horizontally on the background plate 3 shown in FIG. 2 are all the measurement lines. Although the solid lines actually include scales to assist the dimensional measurement, the scales are not shown in FIG. 2. In an imaging operation, the plant stem 2 is positioned to enter a measurement area 7 indicated by the dotted lines. An approximate distance from the upper end of the plant to a portion for which the plant diameter is to be measured can be determined from the measurement lines 6 and the plant stem 2 that are substantially parallel to each other in the imaging operation.

When an image of the plant stem 2 is captured with the imager 1, the background plate 3 shown in FIG. 2 is placed behind the plant stem 2, and the imaging operation is performed twice with the distance between the plant stem 2 and the background plate 3 being unchanged and with the imaging distance being changed simply by moving the imager 1. The method for measuring the diameter of the plant stem 2 will be described below using the image obtained in this manner.

Figure 3B:
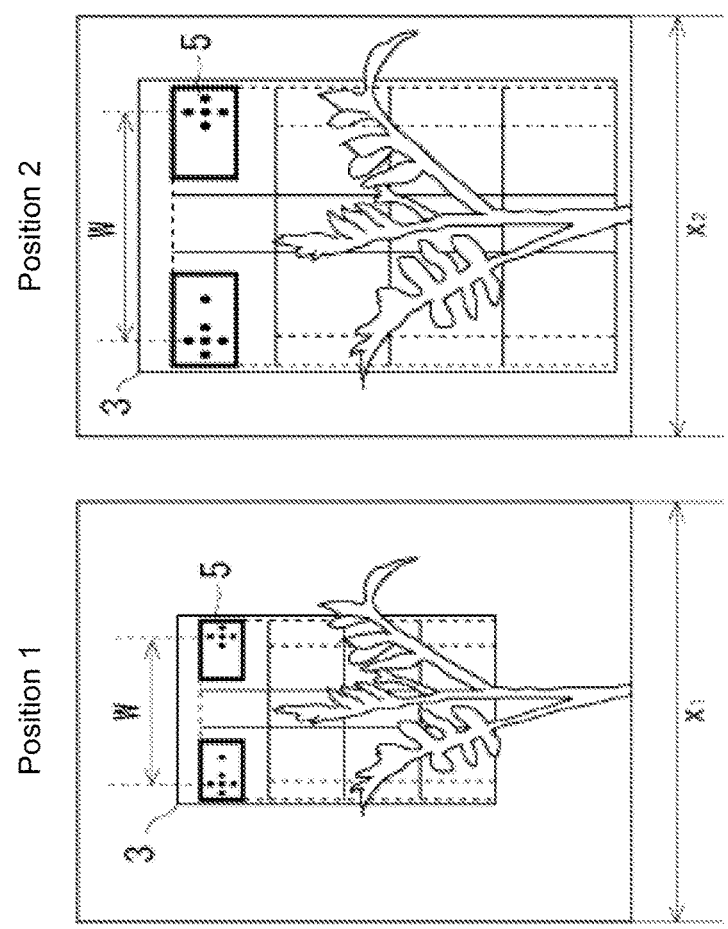
FIG. 3A and FIG. 3B are schematic diagrams of an imaging operation of a plant stem performed twice with a distance between the plant stem and the background plate being unchanged and with an imaging distance being changed simply by moving the imager in the embodiment of the present invention.
Figure 3A:
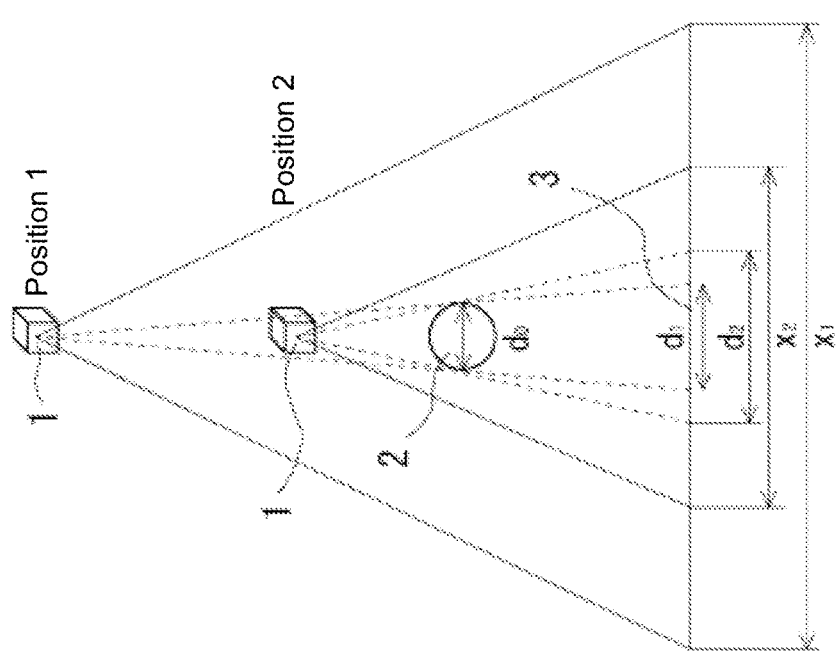

FIG. 3A and FIG. 3B are schematic diagrams of the imaging operation of the plant stem 2 performed twice with the distance between the plant stem 2 and the background plate 3 being unchanged and with the imaging distance being changed simply by moving the imager 1. FIG. 3A is a schematic diagram of the positional relationship between the imager 1, the plant stem 2, and the background plate 3 in the two imaging operations, viewed from above. Of the two imaging operations, position 1 is the position of the imager 1 capturing an image farther from the plant stem 2, and position 2 is the position of the imager 1 capturing an image closer to the plant stem 2. The imaging range obtained based on the distance between the markers 5 at position 1 is $x_1$, and the diameter of the plant stem 2 obtained in the same manner is $d_1$. The imaging range obtained based on the distance between the markers 5 at position 2 is $x_2$, and the diameter of the plant stem 2 obtained in the same manner is $d_2$. The imaging range herein refers to the width of the image in the analysis using an image analysis program.

The true value $d_0$ of the diameter of the plant stem 2 can be calculated by geometry-based calculation using $x_1$, $x_2$, $d_1$, and $d_2$. The true value $d_0$ can be written as Formula 1 below.

[Formula 1]

$$d_0 = \frac{d_1 * d_2 (x_1 - x_2)}{d_2 * x_1 - d_1 * x_2} \quad (1)$$

Table 1 shows the verification results from comparing the values $d_0$ obtained using Formula 1 with the true values of two plants (a plant A and a plant B) having different stem diameters.

TABLE 1

|  | Plant A | Plant B |
| --- | --- | --- |
| $d_1$ | 15.04 mm | 5.20 mm |
| $x_1$ | 489.60 mm | 546.46 mm |
| $d_2$ | 13.32 mm | 5.00 mm |
| $x_2$ | 829.04 mm | 909.12 mm |
| $d_0$ | 11.43394 mm | 4.72610 mm |
| True value | 11.77 mm | 4.90 mm |
| Measurement error | −0.33606 mm | −0.17390 mm |

As shown in Table 1, the measurement error between the values $d_0$ obtained using Formula 1 and each of the true values converges within the target range of the absolute value of 1 mm.

FIG. 3B is a simplified view of images of the plant and the background plate 3 captured with the imager 1 at position 1 and position 2. The diameter of the plant stem 2 in each image is measured using the distance between the markers 5 on the background plate 3 and the width of the target plant stem 2 in the captured image at each position. The distance between the markers 5 on the background plate 3 in the image captured with the imager 1 may be actually obtained as the number of pixels included between the pixels corresponding to the centers of the markers 5 in the image. The width of the plant stem 2 may be obtained as the number of pixels included between the pixels corresponding to the two horizontal edges of the plant stem 2. A distance W between the markers 5 in FIG. 3B is, for example, 30 cm. In an imaging operation, the plant may not be located in the middle, or an image of the plant may be captured at an angle when the background plate 3 is within the imaging range.

Figure 4B:
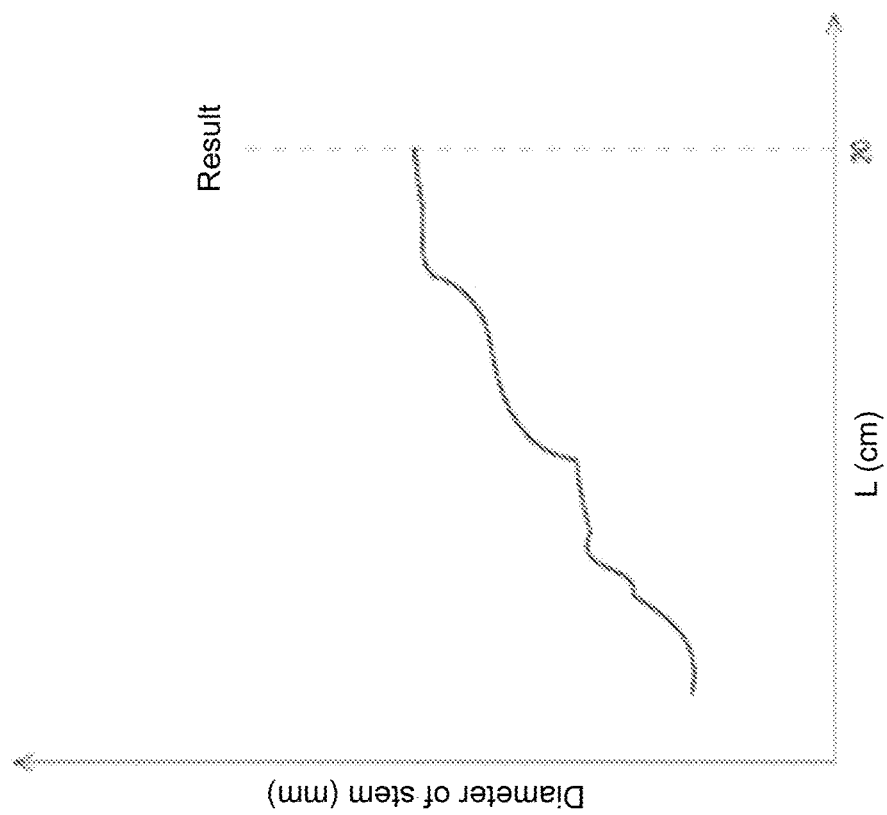
FIG. 4A and FIG. 4B are schematic diagrams of measurement of the diameter of a plant stem using an image analysis program after an imaging operation in the embodiment of the present invention.
Figure 4A:
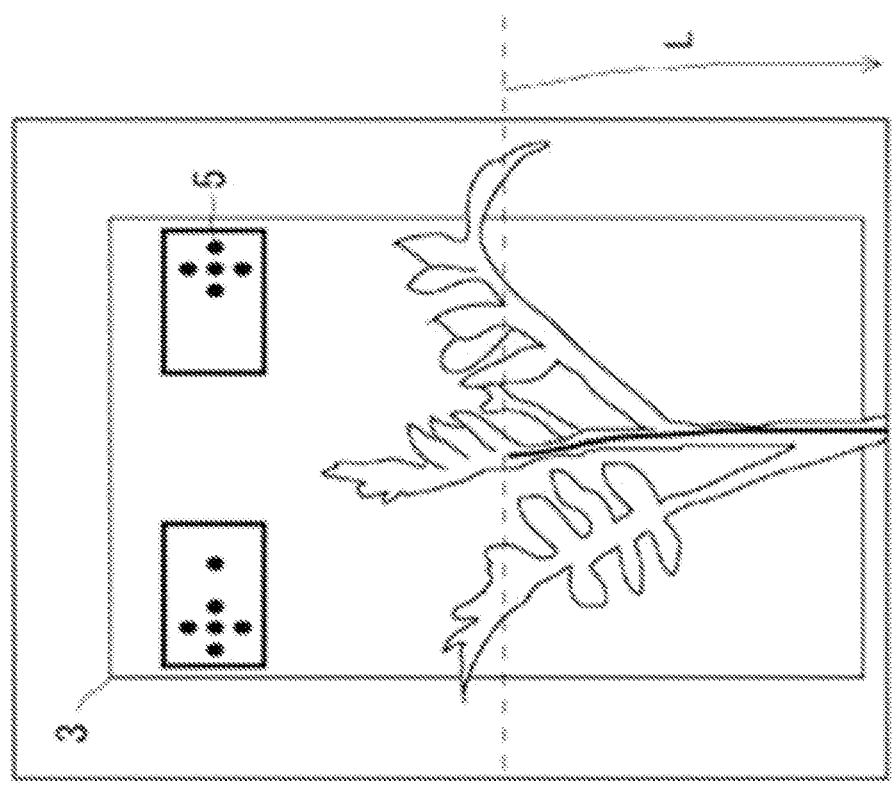

FIG. 4A and FIG. 4B are schematic diagrams of measurement of the diameter of the plant stem 2 using a predetermined image analysis program after the imaging operation. The background plate 3 is simplified in the figure. The image analysis program is prepared to calculate the diameter of the plant stem 2 at the dimensional measurement point using the image including the plant stem 2 and the background plate 3 captured with the imager 1. The image analysis program may be loaded into a common personal computer (PC) (not shown), be stored into a memory such as a read-only memory (ROM) included in the PC, and be executed by a central processing unit (CPU) included in the PC. For the imager 1 being a common digital camera, an image captured with the imager 1 is imported into the PC before being loaded and analyzed by the image analysis program. For the imager 1 being a smartphone or a tablet PC, for example, an image analysis program can also be loaded into the smartphone or the tablet PC for analyzing the image directly after the imaging operation. In the image analysis program, tracing from the upper end of the plant for which the image is captured downward in the direction of the plant stem 2 allows display of the traced trajectory on the image. The traced trajectory is indicated by a bold line in FIG. 4A. The starting point of the traced trajectory is the plant growth point. The measurement point for the diameter of the plant stem 2 is at 20 cm below the growth point. L represents the length downward from the growth point in the direction of the plant stem 2, and does not represent the vertical distance downward from the growth point.

The analysis using the image analysis program outputs a graph with a value L on the horizontal axis and the value of the stem diameter on the vertical axis, as shown in FIG. 4B. The plant stem typically tends to be thicker downward. As shown in FIG. 4B, the value of the stem diameter is greater as the value L is greater. When the plant stem on the image is traced as shown in FIG. 4A in measuring the stem diameter, the width of the stem is calculated at each point in the traced trajectory in accordance with the value of L. The width of the stem at each point is determined based on the distance between the markers 5 on the background plate 3, and the value of the determined width is the diameter of the stem at each point.

In an imaging operation, the plant stem 2 may be covered by branches or leaves of the plant. With the covered portion of the plant stem 2 not identified in the analysis, the plant stem 2 may be determined as being discontinuous. Any such discontinuous portion of the curve of the stem edge obtained by the captured image may be complemented using an additional straight line or an additional spline curve with the image analysis program in the present embodiment. The image analysis thus identifies the plant stem 2 as being continuous. In FIG. 4B, the diameter of the plant stem 2 at L=20 is the measurement value of the diameter of the plant stem 2.

Figure 5:
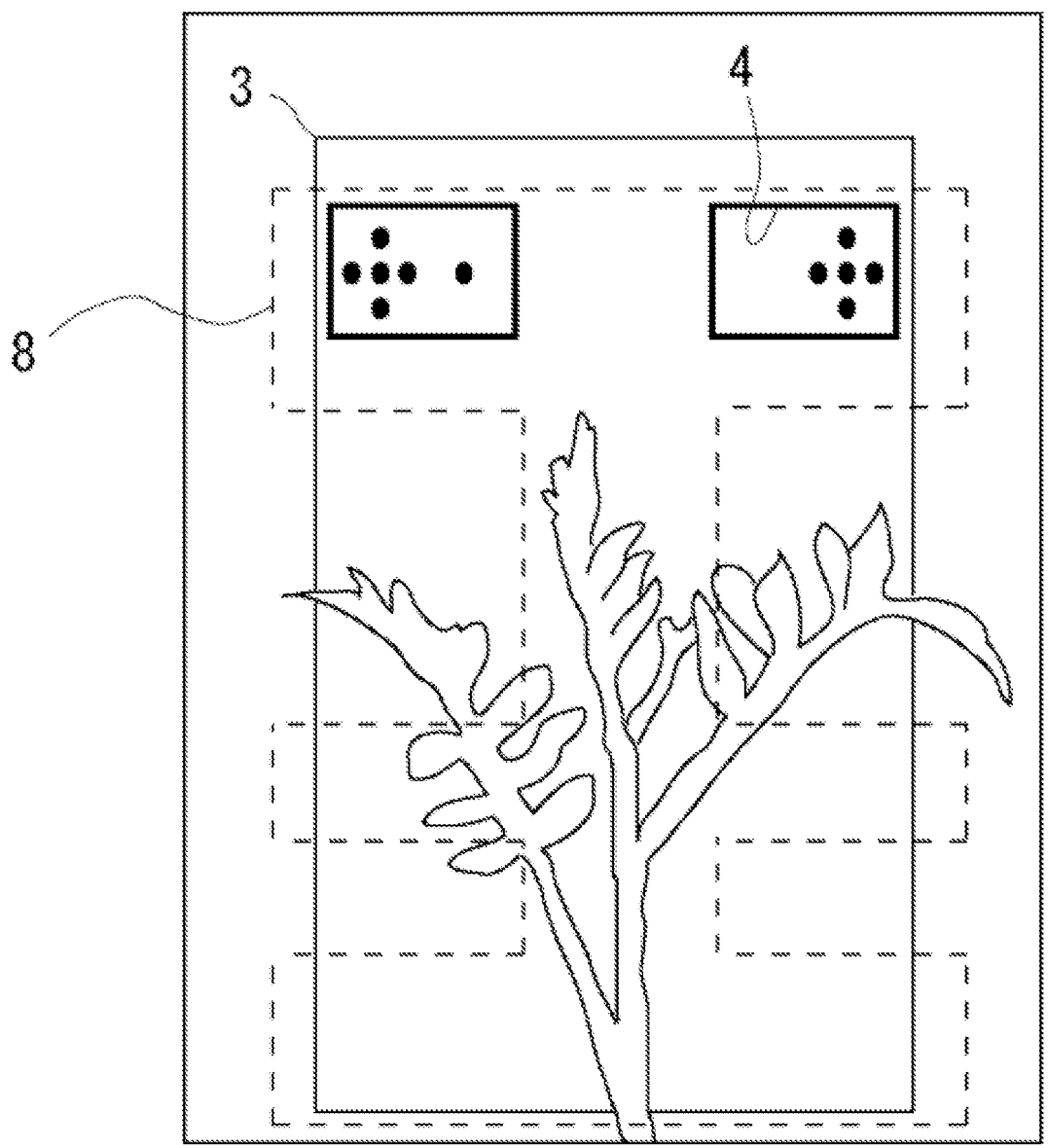
FIG. 5 is a schematic diagram of an imaging mask on an imaging screen viewed by a measurer when an image of a plant stem and the background plate is captured with the imager in the embodiment of the present invention.

FIG. 5 is a schematic diagram of an imaging mask 8 on an imaging screen viewed by the measurer when an image of the plant stem 2 and the background plate 3 is captured with the imager 1. The background plate 3 is simplified in the figure. In capturing an image of the plant stem 2, the plant stem 2 is to be within the measurement area 7 on the background plate 3 shown in FIG. 2. To facilitate positioning of the plant stem 2 on the imaging screen, the imaging mask 8 in the shape of a Chinese character indicated with dotted lines is displayed. Although simplified in FIG. 5, the imaging mask 8 is bright inside the shape of the Chinese character indicated with the dotted lines, with the outside being shadowed and not clearly visible to a person who captures an image. The plant stem 2 and the marker areas 4 are to be within the area of the imaging mask 8 for an imaging operation. In the present embodiment, the imaging mask 8 is displayed on the imaging screen viewed by the measurer in an imaging operation with the imager 1, and the plant stem 2 and the marker areas 4 are located within the frame. This allows the positional relationship between the plant stem 2 and the background plate 3 to be easily determined, thus improving the measurement accuracy of the diameter of the plant stem 2. The imaging mask 8 is simply a tool to facilitate the positioning of the plant stem 2 and may be optional on the imaging screen. The imaging mask 8 may not be in the shape of a Chinese character indicated with the dotted lines, and may be, for example, T-shaped, when the plant stem 2 and the marker areas 4 are within the frame. The imaging mask 8 may not have the shape of a character, and may have, for example, the shape of a plus sign.

The method for measuring a dimension according to the present embodiment allows highly accurate measurement of the diameter of the plant stem 2 with little contact with the plant stem 2 except its contact for fixing the plant stem 2. For the measurement accuracy, the measurement error deviated from the true value can be specifically within the absolute value of 1 mm. In general, plants are to achieve an optimal growth balance in each stage of growth. Measuring the diameter of the plant stem 2 provides an indicator to manage the vegetative growth for the growth balance.

The elements in the aspects of the present invention below are identified with reference numerals used in the drawings to show the correspondence between these elements and the components in the embodiments.

Aspect 1

A method for measuring a dimension of a plant with an image of the plant captured with an imager (1), the method comprising:
placing, behind the plant, a background plate (3) including a dimensional reference (5) in capturing the image of the plant with the imager;
capturing an image of a dimensional measurement point of the plant a plurality of times with a distance between the dimensional measurement point and the background plate being unchanged and with an imaging distance being changed by moving the imager; and
measuring the dimension of the plant based on a dimension at the dimensional measurement point in a plurality of images resulting from capturing the image the plurality of times using the dimensional reference included in the background plate and on a range of imaging with the imager in each of the plurality of images.

REFERENCE SIGNS LIST

1 imager
2 plant stem
3 background plate
4 marker area
5 marker
6 measurement line
7 measurement area
8 imaging mask

The invention claimed is:

1. A method for measuring a dimension of a plant with an image of the plant captured with an imager, the method comprising:
placing, behind the plant, a background plate including a dimensional reference in capturing the image of the plant with the imager;
capturing an image of a dimensional measurement point of the plant a plurality of times with a distance between the dimensional measurement point and the background plate being unchanged and with an imaging distance being changed by moving the imager; and
measuring the dimension of the plant based on a value of a dimension at the dimensional measurement point in a plurality of images resulting from capturing the image the plurality of times using the dimensional reference included in the background plate and on a range of imaging with the imager in each of the plurality of images.

2. The method according to claim 1, wherein
the dimensional measurement point of the plant includes a diameter of a stem of the plant at a predetermined length below a growth point of the plant.

3. The method according to claim 1, wherein
the dimensional reference includes a plurality of markers located on the background plate being white, and the plurality of markers are at a predetermined distance from one another.

4. The method according to claim 1, wherein
the capturing the image of the dimensional measurement point includes
displaying an imaging mask being a frame on an imaging screen of the imager, and
placing the dimensional measurement point and the dimensional reference at a predetermined position inside the imaging mask on the imaging screen of the imager to determine a positional relationship between the dimensional measurement point and the dimensional reference.

* * * * *